United States Patent
Yasuda et al.

(10) Patent No.: US 8,246,112 B2
(45) Date of Patent: Aug. 21, 2012

(54) VEHICLE SEAT

(75) Inventors: Masanari Yasuda, Tochigi (JP); Kenichi Nitsuma, Tochigi (JP); Takamasa Adachi, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 307 days.

(21) Appl. No.: 12/669,673

(22) PCT Filed: Jul. 17, 2008

(86) PCT No.: PCT/JP2008/062916
§ 371 (c)(1),
(2), (4) Date: Jan. 19, 2010

(87) PCT Pub. No.: WO2009/011387
PCT Pub. Date: Jan. 22, 2009

(65) Prior Publication Data
US 2010/0181810 A1    Jul. 22, 2010

(30) Foreign Application Priority Data
Jul. 19, 2007   (JP) .................................. 2007-188887

(51) Int. Cl.
*B60N 2/42* (2006.01)
(52) U.S. Cl. ................................. 297/216.12
(58) Field of Classification Search ............ 297/216.12, 297/216.13, 216.14, 216.1
See application file for complete search history.

(56) References Cited

U.S. PATENT DOCUMENTS

| | | | | | |
|---|---|---|---|---|---|
| 5,378,043 | A | * | 1/1995 | Viano et al. | 297/408 |
| 5,884,968 | A | * | 3/1999 | Massara | 297/216.12 |
| 5,927,804 | A | * | 7/1999 | Cuevas | 297/216.12 |
| 6,749,256 | B1 | * | 6/2004 | Klier et al. | 297/216.12 |
| 6,871,913 | B2 | * | 3/2005 | Malsch et al. | 297/410 |
| 7,077,472 | B2 | * | 7/2006 | Steffens, Jr. | 297/216.13 |
| 7,404,606 | B2 | * | 7/2008 | Kim | 297/408 |
| 2010/0270834 | A1 | * | 10/2010 | Niitsuma | 297/216.12 |
| 2010/0295348 | A1 | * | 11/2010 | Takayasu et al. | 297/216.12 |

FOREIGN PATENT DOCUMENTS

| JP | 2006-182094 A | 7/2006 |
|---|---|---|
| JP | 2006-347436 A | 12/2006 |
| JP | 2007-062522 A | 3/2007 |

* cited by examiner

*Primary Examiner* — Milton Nelson, Jr.
(74) *Attorney, Agent, or Firm* — Drinker Biddle & Reath LLP (57) ABSTRACT

A vehicle seat has a mechanism for moving a headrest upon a rear-end collision, wherein the vehicle seat comprises a plate-like support body for receiving a load of a rearward movement of an occupant; a link mechanism for transmitting the load received by the plate-like support body to the headrest side, and comprising a lower link, an upper link, and a connecting link; and a load retaining member for blocking the load received by the plate-like support body from being transmitted to the link mechanism, until the load reaches a predetermined level; wherein the load retaining member is held by one of the lower link and the connecting link, and is configured to urge the lower link and the connecting link in a separating direction.

12 Claims, 8 Drawing Sheets

VEHICLE SEAT

CROSS-REFERENCE TO RELATED APPLICATIONS

This application is the U.S. national phase of the International Patent Application No. PCT/JP2008/062916 filed Jul. 17, 2008, which claims the benefit of Japanese Patent Application No. 2007-188887 filed Jul. 19, 2007, the entire content of which is incorporated herein by reference.

BACKGROUND

The present invention relates to a vehicle seat, and particularly to a vehicle seat having a mechanism for moving a headrest upon rear-end collision.

Upon occurrence of collision against a vehicle, such as an automobile, from the rear, i.e., upon occurrence of a so-called rear-end collision, it is likely that a head portion of a seating occupant is suddenly moved rearward due to inertia such that a neck portion of the occupant is likely to be subjected to an impactive shock. As such, so as to protect a head portion, neck portion, and the like, of an occupant from an impact upon rear-end collision, there has been conventionally known a vehicle seat provided with a configuration for forwardly moving a headrest upon occurrence of rear-end collision in a manner to support the head portion of the occupant to thereby mitigate an impactive shock against the neck portion (see Japanese Unexamined Patent Publication No. 2006-182094 ("the '094 Publication"), for example).

The vehicle seat described in the '094 Publication is configured to include: a plate body forwardly and rearwardly movably mounted to a backrest frame of a backrest seat; a headrest forwardly and rearwardly movably mounted to an upper portion of the backrest frame through upper links; lower links connected to the plate body and rotatably provided at a lower portion of the backrest frame; and motion transmission members for interconnecting the lower links with the upper links, respectively; such that a load sensed by the plate body upon rear-end collision is transmitted to the upper links, to move the headrest forward.

According to the above vehicle seat, it is possible to assuredly sense a rear-end collision by receiving a load upon rearward movement of an occupant due to rear-end collision, not from a back portion of the occupant, but from a vicinity of a waist portion of the occupant which exhibits a rearward displacement larger than that of the back portion. Further, the configuration for transmitting the load received by the plate body to the upper links through the lower links and motion transmission members, enables transmission of the load to the upper links with an excellent transmission efficiency, thereby ensuring a forward movement operation of the headrest.

Although the vehicle seat described in the '094 Publication is capable of assuredly sensing a load caused by a rearward movement of an occupant and received by the backrest seat, the headrest is disadvantageously moved forward, also in a situation that a load larger than that in an ordinary seating state of the occupant is applied to the backrest seat due to reasons other than rear-end collision of the vehicle, such as a situation in which the vehicle is rapidly accelerated and thus the occupant is rapidly moved rearward.

SUMMARY

It is therefore an object of the present invention to provide a vehicle seat, which is capable of assuredly detecting a rearward movement load of an occupant upon rear-end collision to forwardly move a headrest to thereby support a head portion of the occupant, which is capable of preventing a forward movement of the headrest when a load smaller than a predetermined level is applied to a seat-back due to reasons other than rear-end collision, and which is capable of exhibiting a lumbar supporting function of the seat-back.

The above problem is solved by a vehicle seat having a mechanism for moving a headrest upon rear-end collision, comprising: a pressure receiving part for receiving a load of a rearward movement of an occupant; transmitting element(s) for transmitting the load received by the pressure receiving part to the headrest side; and blocking element(s) for blocking the load received by the pressure receiving part from being transmitted to the transmitting element(s), until the load reaches a predetermined level.

In this way, this vehicle seat comprises the transmitting element(s) for transmitting the load received by the pressure receiving part to the headrest side, and the blocking element(s) for blocking the load received by the pressure receiving part from being transmitted to the transmitting element(s) while the load is smaller than a predetermined level, so that the headrest is not moved when a rearward load larger than that in an ordinary seating state and smaller than that upon rear-end collision is applied to a seat-back such as a situation that a rearward load from an occupant is applied to the seat-back due to rapid acceleration of a vehicle, thereby enabling to prevent a movement of the headrest toward a head portion of the occupant in a state other than rear-end collision.

It is preferable that the transmitting element(s) comprises: a lower link rotatably mounted to a lower portion of a seat-back frame of the vehicle seat and connected to the pressure receiving part; an upper link connected to the headrest to allow for a rotation thereof; and a connecting link for connecting the lower link and the upper link to each other, and configured to operate in an interlocking manner with a rotation of the lower link; and wherein the blocking element(s) is held by one of the lower link and the connecting link, and is configured to urge the lower link and the connecting link in a separating direction.

In this way, the blocking element(s) is held by and fixed to one of the lower link and the connecting link in a manner to keep the other in a state movable relative to the blocking element(s), so that the transmitting element(s) is actuated against an urging force of the blocking element(s) upon application of a load larger than a predetermined level in a manner to transmit the load to the headrest side to thereby enable the headrest to move, without deteriorating an inherent headrest moving function.

At this time, it is desirable that at least a part of the blocking element(s) is disposed between the lower link and the connecting link.

In this way, the blocking element(s) is mounted such that the part thereof is disposed between the lower link and the connecting link, so that transmission of a load due to reasons other than rear-end collision can be blocked at an initial position of a transmission path of the load received by the pressure receiving part, thereby achieving an excellent load blocking efficiency. Further, since the load is blocked at an initial stage, the blocking element(s) does not affect the lower portion of the seat-back, i.e., the vicinity of a lumbar of an occupant, thereby enabling obtainment of a stabilized seating feeling.

It is further preferable that the blocking element(s) is configured to include a locking portion configured to be held by one of the lower link and the connecting link, and a blocking portion configured to block a movement of the other of the lower link and the connecting link.

In this way, since the blocking element(s) is configured to include the blocking portion at a side opposite to that side of the blocking element(s) which is held by one of the lower link and the connecting link, the movement of the other of the lower link and the connecting link can be blocked by the blocking portion in addition to by the urging force of the blocking element(s), resulting in that a blockable load can be increased to a certain level, and thus the blocking element(s) can be adjusted so as not to transmit the load applied to the pressure receiving part to the headrest side until a certain level.

Further, it is desirable that the blocking portion includes a first tilt surface having a certain angle relative to a moving direction in which the lower link or the connecting link moves based on the load received by the pressure receiving part, and a second tilt surface continued from the first tilt surface and tilted relative to the moving direction and in a direction opposite to the first tilt surface, to thereby block the movement of the lower link or the connecting link by the first tilt surface.

In this way, by providing the first tilt surface defining a certain angle relative to a moving direction in which the lower link or the connecting link moves, it becomes possible to block the movement of the lower link or the connecting link by the first tilt surface when a load is applied to the pressure receiving part. It is further possible to determine a threshold value for blocking a load transmission, by appropriately determining the angle of the first tilt surface. Furthermore, by providing the second tilt surface continued from the first tilt surface and tilted in a direction opposite to the first tilt surface, the link mechanism is allowed to be activated without an application of excessive load after commencement of the movement of headrest due to rear-end collision, i.e., after commencement of the activation of the link mechanism. Further, when the load applied to the pressure receiving part is released and thus the headrest is to be returned to its raising position after the movement of the headrest due to rear-end collision, the lower link or the connecting link slides on the boundary portion between the first tilt surface and the second tilt surface, without obstructing a returning operation of the headrest.

At this time, it is preferable that the second tilt surface defines an angle relative to the moving direction in which the lower link or the connecting link moves, which angle is smaller than the angle of the first tilt surface. This facilitates the activation of the link mechanism upon occurrence of rear-end collision and the return of the link mechanism after the activation, without disturbing the function of the link mechanism.

Further, the first tilt surface and the second tilt surface of the blocking portion are formed of a curved surface, thereby improving operability in case of activation of the transmitting element(s) upon rear-end collision, and in case of a returning operation of the headrest.

Note that the blocking element(s) may be formed from a plate spring, so that the blocking element(s) can be manufactured by folding a single piece of plate spring, to reduce the number of parts and the cost thereof. Further, the blocking element(s) can be manufactured as a part separate from the seat-back frame, thereby enabling adding the part without complicating a manufacturing process. Moreover, the part can be downsized and can be mounted into a smaller space, thereby enabling its mounting without upsizing the seat frame.

According to such a vehicle seat, it is possible to optimize a motion commencement of a headrest, without deteriorating a function to forwardly move the headrest upon rear-end collision to thereby hold and protect a head portion. It is further possible to prevent a backlash of a seat-back near a lumbar region due to a rearward load in an ordinary seating state, thereby simultaneously establishing a protecting function upon rear-end collision and a seating function during seating.

BRIEF DESCRIPTION OF DRAWINGS

Various embodiments of the invention are illustrated in the following drawings and discussed below.

DETAILED DESCRIPTION OF THE EMBODIMENTS

Embodiments of the present invention will be described hereinafter based on the drawings. The members, arrangements, and the like to be described hereinafter are not intended to restrict the present invention, and can be of course variously modified within the scope of the present invention.

Figure 1:
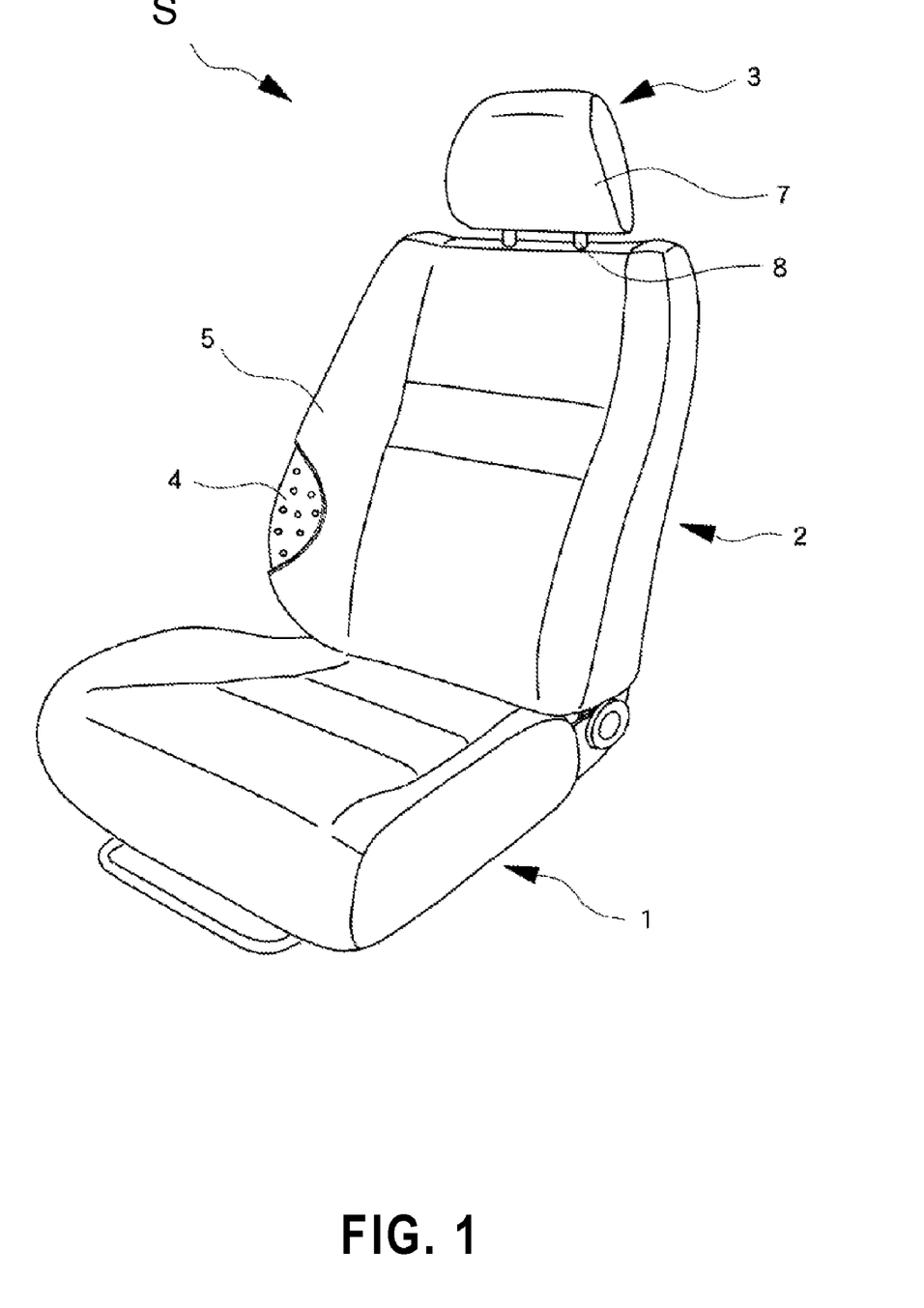
FIG. 1 is a perspective view of a vehicle seat.

As shown in FIG. 1, the vehicle seat S of this embodiment comprises a seating portion 1, a seat-back 2, and a headrest 3 mounted on an upper portion of the seat-back 2. The seating portion 1 and seat-back 2 of this embodiment are established by mounting cushion materials 4 on a seating frame 10 and a seat-back frame 20 (see FIG. 2), and by covering outer peripheries of the cushion materials 4 with outer cover materials 5, respectively. Although the headrest 3 has an arbitrary configuration, the headrest 3 is configured to comprise, at least, a head-portion supporting part 7 for supporting a head portion of an occupant, and pillars 8 for mounting the head-portion supporting part 7 to the seat-back 2.

Figure 2:
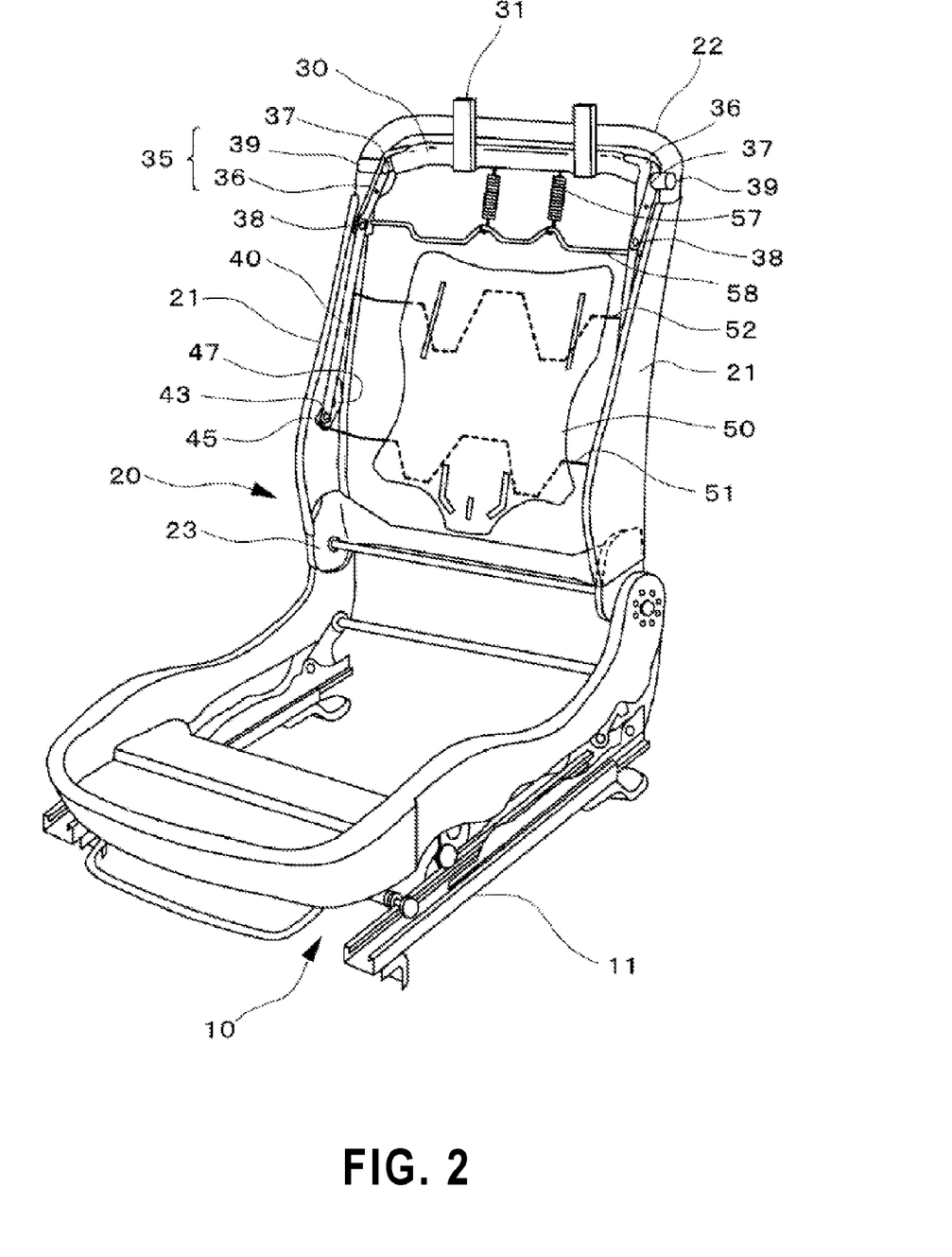
FIG. 2 is a perspective view of a frame of the vehicle seat.

As shown in FIG. 2, frames of the vehicle seat S of this embodiment comprise: a seating frame 10 for constituting the seating portion 1; a seat-back frame 20 for constituting the seat-back 2; a base frame 11 for connecting the vehicle seat S to a floor (not shown) of a vehicular body; and the like. The seat-back frame 20 includes: a pair of side frames 21, 21 disposed to be laterally separated from each other and each having a predetermined length in an up-and-down direction; an upper frame 22 for connecting upper end portions of the side frames 21, 21 to each other; and a lower frame 23 for connecting lower end portions of the side frames 21, 21 to each other.

Disposed near the upper frame 22 inside the seat-back frame 20, is a headrest mounting rod 30 for holding the headrest 3 and extending in a right-and-left direction. The pillars 8 of the headrest 3 are penetrated through two pillar supporting members 31 provided on the headrest mounting rod 30, respectively, in a height adjustable manner. The configurations of the pillars 8 and pillar supporting members 31 are known, and engaging members provided on the pillar supporting members 31 are engaged with engaging concave portions (not shown) formed on the pillars 8, respectively, to thereby hold them.

Further, fixed to both ends of the headrest mounting rod 30 are ends of plate-like link brackets 36 by welding or the like, respectively, and each link bracket 36 is rotatably connected to one end of a rotate supporting member 39 at the seat-back frame 20 side through a shaft 37. The rotate supporting member 39 of this embodiment is welded to a vicinity of a connecting portion of the upper frame 22 to the applicable side frame 21. Note that the link bracket 36 and the rotate supporting member 39 constitute an upper link 35 in this embodiment.

In this way, the headrest mounting rod 30 is rotatably mounted to the seat-back frame 20, through the link brackets 36 and rotate supporting members 39 via shafts 37. Namely, in a state that the headrest 3 is mounted on the headrest mounting rod 30, the headrest 3 is configured to be rotated around the shafts 37, relative to the seat-back frame 20.

The headrest 3 constitutes an active head mechanism that forwardly moves relative to the seat-back 2 when the vehicle is subjected to an impact from the rearward and thus an occupant is rearwardly moved, thereby actively supporting a head portion of the occupant. The forward movement of the headrest 3 is conducted by link mechanisms as a transmitting element(s). The link mechanisms each comprise: the upper link 35; a lower link 45; and a connecting link 40 for connecting the upper link 35 to the lower link 45. The activation of the link mechanisms will be described below.

As shown in FIG. 2, each link bracket 36 extends downwardly from its connecting portion to the headrest mounting rod 30. Rotatably fixed to an end of the link bracket 36 opposite to the headrest mounting rod 30, is an upper end portion of the associated connecting link 40 through a shaft 38.

Figure 4A:
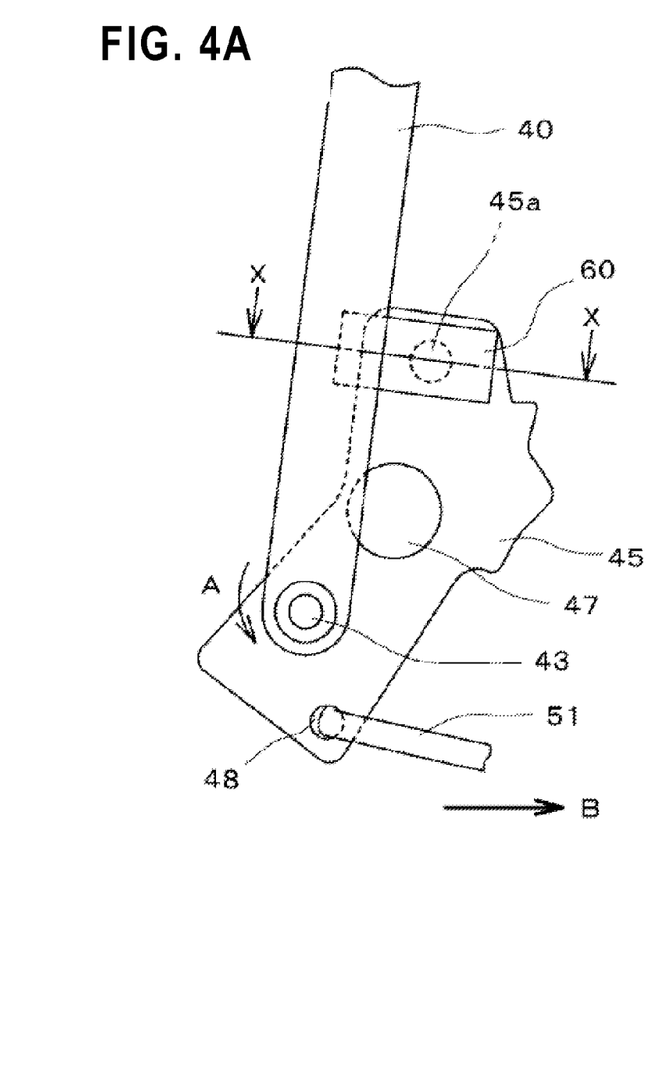
FIGS. 4A, B are side views of an operation of a lower link.
Figure 4B:
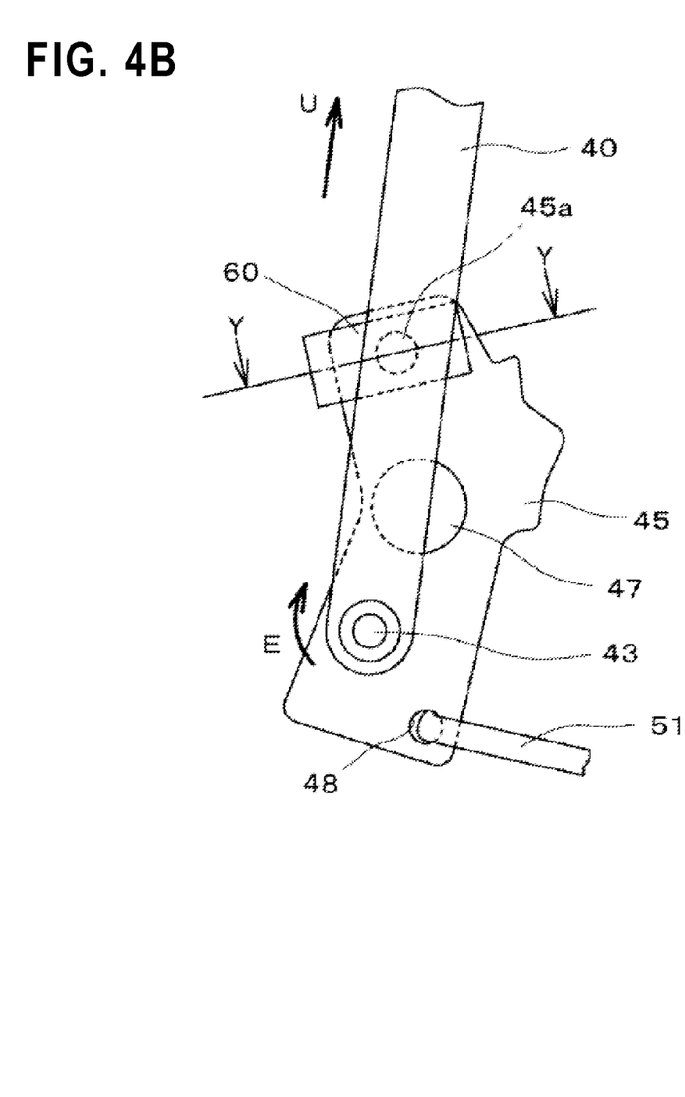

The connecting link 40 is a plate-like member extending in an up-and-down direction, and is suspended from a lower end portion of the link bracket 36. As shown in FIG. 2 and FIG. 4, the connecting link 40 has a lower end portion rotatably connected to a lower front corner of the associated lower link 45 through a shaft 43. In this way, the connecting link 40 connects the lower link 45 and upper link 35 to each other.

The lower link 45 is a plate-like member in a substantially L shape, and is rotatably fixed to an inside face of the associated side frame 21 through a shaft 47. Further, the lower link 45 is formed with a wire locking hole 48 below the shaft 43, so as to penetrate one end of a wire spring 51, described below, through the wire locking hole 48 such that the end of the wire spring 51 is bent and fastened into the wire locking hole 48.

As shown in FIG. 2, disposed at a central portion of the seat-back frame 20 is a plate-like support body 50 as a pressure receiving part. This plate-like support body 50 is a plate-like member for supporting a back portion of an occupant, and has a function: to support the back portion of the occupant by a face in an ordinary seating state to thereby stabilize a seating posture of the occupant; and to be pushed and rearwardly moved by a rearward movement of the occupant upon subjection of the vehicle to a collision from the rearward to thereby activate the link mechanisms.

The plate-like support body 50 is forwardly and rearwardly movably mounted to the right and left seat-back frames 20 through two wire springs 51, 52 disposed in parallel one above the other. The upwardly disposed wire spring 52 is mounted to the seat-back frame 20, while the downwardly disposed wire spring 51 is mounted to the seat-back frame 20 through the lower links 45 by fastening the wire spring 51 into the wire locking holes 48 of the lower links 45, respectively, as described above.

The plate-like support body 50 of this embodiment is formed of a synthetic resin such as polypropylene having a strength at such a level capable of supporting an occupant, and is configured to support the occupant upon receipt of a rearward load from the occupant with some elastic deformation of the plate-like support body. Further, the wire springs 51, 52 of this embodiment each have a predetermined elasticity, and are extended to a certain extent upon application of a load to the plate-like support body 50 to thereby move the plate-like support body 50 rearward. Usable as such wire springs 51, 52 are zigzag springs, formed wire springs, or the like.

Disposed above the plate-like support body 50 is a spring supporting wire 58 extending in a right-and-left direction and having opposite ends fixed to the side frames 21, respectively, and two return springs 57 are disposed in a separate and mutually parallel manner between the headrest mounting rod 30 and the spring supporting wire 58. These return springs 57 rearwardly urge the headrest mounting rod 30 in a manner to cause the headrest 3 to raise, in a state other than rear-end collision of the vehicle.

Further, disposed between the connecting links 40 and lower links 45 in the vehicle seat S of this embodiment, are load retaining members 60 as blocking element(s) for blocking rotation of the connecting links 40 and lower links 45 insofar as the plate-like support body 50 receives a load smaller than that to be applied upon rear-end collision.

Figure 3A:
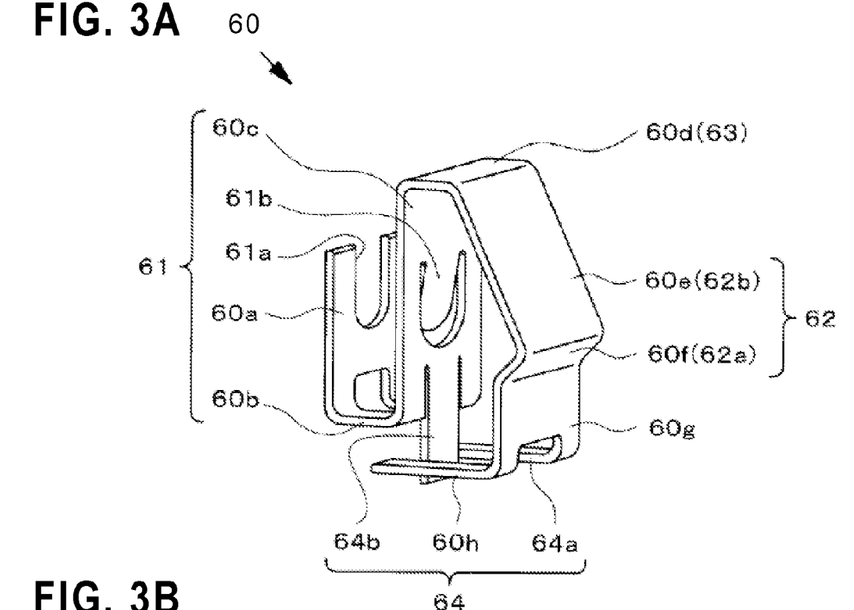
FIGS. 3A-3D are perspective, side, front, and rear views, respectively, of a load retaining member.
Figure 3B:
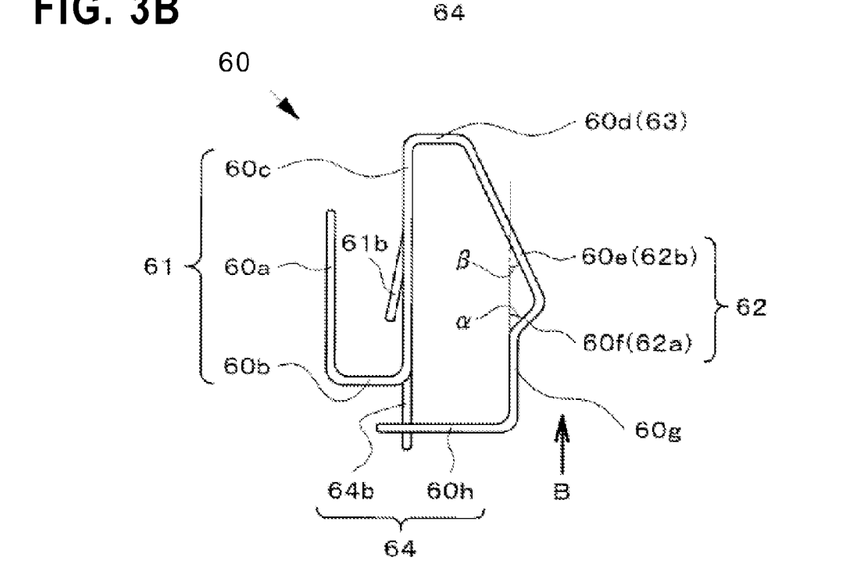
Figure 3C:
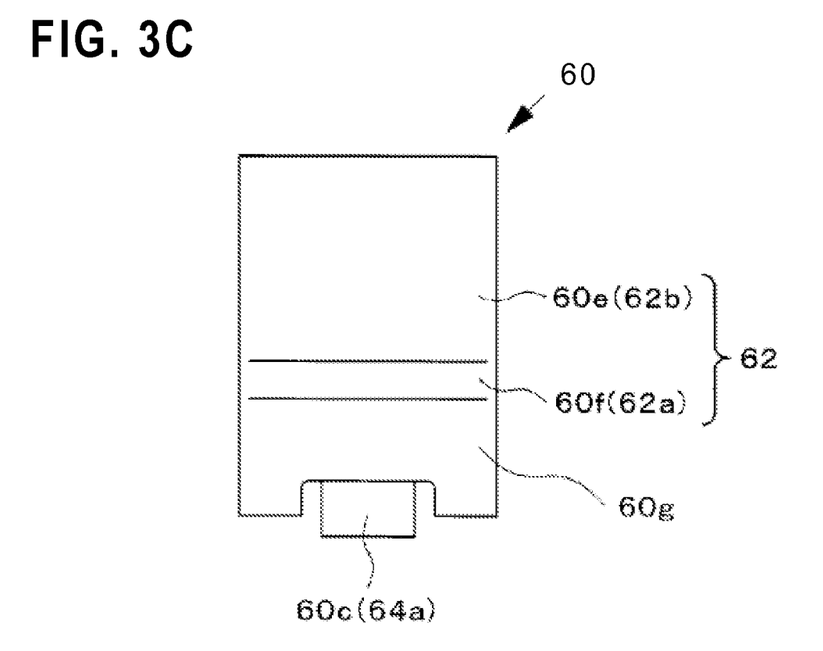
Figure 3D:
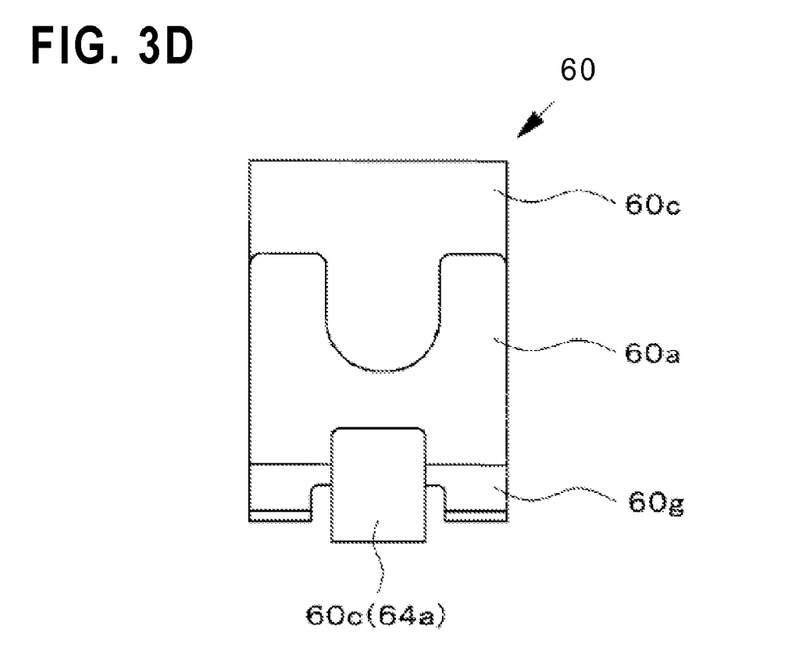

FIG. 3A-D are explanatory views showing the load retaining member 60 of this embodiment, in which FIG. 3A is a perspective view of the load retaining member 60, FIG. 3B is a side view thereof, FIG. 3C is a front view thereof, and FIG. 3D is a rear view thereof. Each load retaining member 60 of this embodiment is formed by folding a single piece of plate spring into segment 60a, segment 60b, segment 60c, segment 60d, segment 60e, segment 60f, segment 60g, and segment 60h as shown in FIG. 3A, by bending. Further, the load retaining member 60 comprises: a locking portion 61; a blocking portion 62; a connecting portion 63 for connecting the locking portion 61 to the blocking portion 62; and a flexure allowing portion 64 formed at a position opposed to the connecting portion 63.

The locking portion 61 fixes the load retaining member 60 to the associated lower link 45, and comprises the segment 60a, segment 60b, and segment 60c formed into a rectangular shape having one open side as shown in FIG. 3B, so as to clamp the lower link 45. Further, the segment 60a is formed with an engaging groove 61a upwardly cut out into a U shape from the central portion of the segment 60a, while the segment 60c is formed with a semi-oval pressure engaging portion 61b by forming a U shaped cutout at the central portion of the segment 60c. The engaging groove 61a and pressure engaging portion 61b are provided for ensuring fixation of the load retaining member to the lower link 45, described below, by engaging with the engaging convex portion 45a and engaging concave portion 45b, respectively.

The blocking portion 62 is provided for blocking the associated connecting link 40 from moving rearward, and comprises the segment 60e, segment 60f, and segment 60g. The segment 60f forms a first tilt surface 62a bent to have a certain angle relative to a rearward movement direction of the connecting link 40, i.e., a direction of arrow B in FIG. 3B, while the segment 60e is extended continuously from the first tilt surface 62a to thereby form a second tilt surface 62b tilted in a direction opposite to the first tilt surface 62a with respect to the rearward movement direction of the connecting link 40. Note that, in the load retaining member 60 of this embodiment, the angle α defined by the first tilt surface 62a relative to the rearward movement direction (direction of arrow B in FIG. 3B) of the connecting link 40, is formed to be 45 degrees. Further, the angle β defined by the second tilt surface 62b relative to the rearward movement direction of the connecting link 40, is formed smaller than the angle α defined by the first tilt surface 62*a*.

The connecting portion 63 is provided to connect the locking portion 61 to the blocking portion 62, and comprises the segment 60*d*. The flexure allowing portion 64 comprises: the segment 60*h*; a groove 64*a* formed at an intermediate portion of the segment 60*h*; and a guiding portion 64*b* extended from the segment 60*c* in the direction of the segment 60*h*, and having a width narrower than that of the groove 64*a* so as to be positioned in the groove 64*a*. The load retaining member 60 is configured such that a part thereof is disposed between the connecting link 40 and lower link 45 in a manner to allow for a flexure by crossing the segment 60*c* and segment 60*h* with each other when pressed and elastically deformed.

Figure 5A:
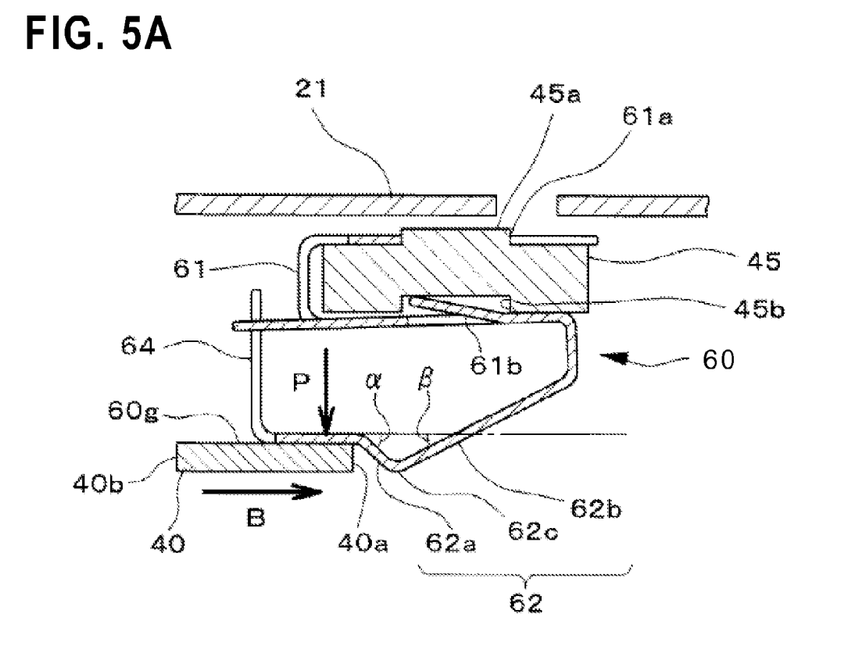
FIGS. 5A, B are cross-sectional views of the operation of the lower link.

FIG. 5A shows a mounting state of the load retaining member 60 in a normal state (a state that the headrest is raising in a situation other than rear-end collision), and this is a cross-sectional view along line X-X of FIG. 4A. As shown in FIG. 5A, the load retaining member 60 is disposed to fit the plate-like lower link 45 into the load retaining member from the opening side of the locking portion 61 of the load retaining member 60 to thereby clamp the lower link 45, while abutting a surface of the segment 60*g* of the blocking portion 62 on the connecting link 40, such that the flexure allowing portion 64 is positioned between the connecting link 40 and the lower link 45. Further, the load retaining member 60 is mounted so that the rear (right in FIG. 5A) end 40*a* of the connecting link 40 is positioned forward (left in FIG. 5A) of the first tilt surface 62*a* of the blocking portion 62 of the load retaining member 60.

To ensure fixation of the load retaining member 60 to the lower link 45, the engaging groove 61*a* of the load retaining member 60 is engaged with the engaging convex portion 45*a* formed on that surface of the lower link 45 which is faced to the associated side frame 21. Further, the pressure engaging portion 61*b* of the load retaining member 60 is engaged with the engaging concave portion 45*b* formed on that surface of the lower link 45 which is opposite to the side frame 21. The pressure engaging portion 61*b* is bent toward the lower link 45 side, to push the engaging concave portion 45*b*.

This load retaining member 60 urges the connecting link 40 and the lower link 45 in a separating direction, i.e., in a direction of arrow P in FIG. 5A, by virtue of the elasticity of the plate spring. Note that reference character P denotes a spring force (elasticity). Thus, the load retaining member 60 exhibits a function as a stopper for the connecting link 40 until application of a load larger than a predetermined level thereto, in a manner to increase a load for activating the link mechanisms based on a rearward load of the occupant received by the plate-like support body 50, i.e., to increase a motion commencement load, by virtue of the spring force P and the first tilt surface 62*a* of the blocking portion 62 positioned rearward (rightward in FIG. 5A) of the connecting link 40.

Next, the vehicle seat S will be explained for its operation upon occurrence of rear-end collision of the vehicle.

Figure 6:
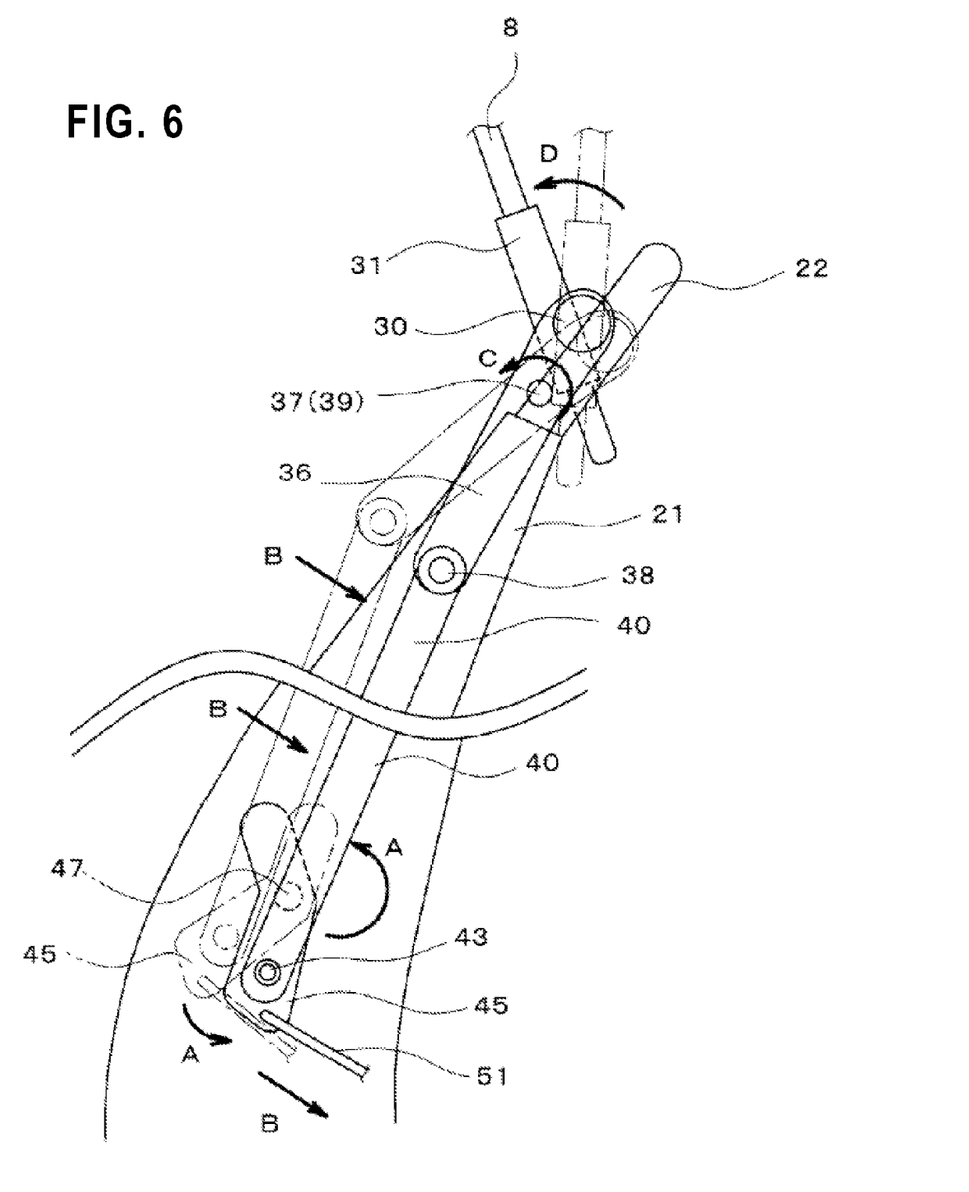
FIG. 6 is a side view of an operation of a link mechanism caused by rear-end collision.

As shown in FIG. 6, when the vehicle undergoes collision from the rearward and the plate-like support body 50 undergoes a load larger than a predetermined level, the plate-like support body 50 and wire spring 51 are rearwardly moved. The rearward movement of the wire spring 51 rotates the lower links 45 about the shafts 47 in a direction of arrow A in FIG. 6, respectively.

The rotation of each lower link 45 rearwardly moves the associated shaft 43 connecting the lower link 45 to the connecting link 40, so that the connecting link 40 is rearwardly moved, i.e., in the direction of arrow B in FIG. 6. As a result, the lower side of the link bracket 36 connected to the upper side of the connecting link 40 is rearwardly rotated, so that the link bracket 36 is rotated around the shaft 37 of the link bracket 36 in a direction of arrow C in FIG. 6. This moves the headrest mounting rod 30 connected to the upper side of the link bracket 36, in a direction of arrow D in FIG. 6, i.e., in the forward direction, so that the headrest 3 is moved forward.

The link mechanisms are activated based on the load received by the plate-like support body 50 upon rear-end collision of the vehicle in a manner to forwardly move the headrest 3 to support the head portion of the occupant. However, when the load for activating the link mechanisms, i.e., the motion commencement load, is set at a small value, the link mechanisms are caused to be activated even by such a load smaller than that upon rear-end collision, which load is to be generated due to reasons other than rear-end collision, such as rapid acceleration of the vehicle, so that the headrest 3 is caused to be moved forward. Thus, to prevent a forward movement of the headrest by a load smaller than that to be generated upon rear-end collision, the load retaining members 60 are provided as blocking element(s) at the lower links 45, respectively, in the vehicle seat S of this embodiment.

Figure 5B:
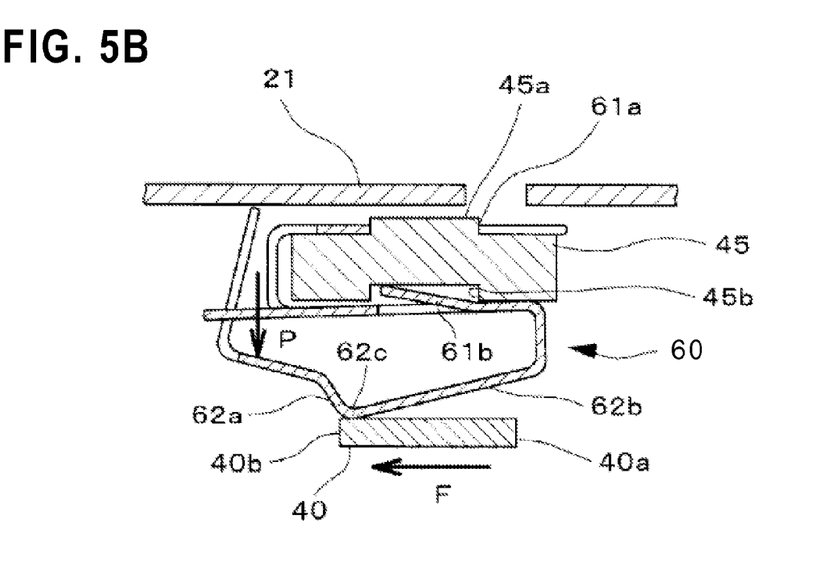

The load retaining members 60 will be each explained for the function thereof with reference to FIGS. 4A-5B. FIG. 4A is an enlarged explanatory view around the lower link 45 in an ordinary state, FIG. 5A is a cross-sectional view along line X-X thereof, FIG. 4B is an enlarged explanatory view around the lower link 45 in a state that the link mechanism is activated due to occurrence of rear-end collision, and FIG. 5B is a cross-sectional view along line Y-Y thereof.

In an ordinary seating state as shown in FIG. 5A, the spring force (elasticity) P of the load retaining member 60 acts in a direction from the lower link 45 to the connecting link 40, thereby urging the connecting link 40. Further, the rear (right in FIG. 5A) end 40*a* of the connecting link 40 is positioned forward (left in FIG. 5A) of the first tilt surface 62*a* of the blocking portion 62 of the load retaining member 60.

When the plate-like support body 50 undergoes a rearward load from a seating occupant in this state, the wire spring 51 pulls each lower link 45, to exert a force which tends to move the lower link 45 and connecting link 40 in a rearward direction, i.e., the directions of arrow B in FIG. 4A and FIG. 5A, respectively. Here, the connecting link 40 is blocked from rearwardly moving until the rearward load exceeds a certain constant level smaller than a load level upon rear-end collision, by virtue of a frictional force caused by the spring force P of the load retaining member 60 formed of the plate spring, and by virtue of the first tilt surface 62*a* positioned rearward of the rear end 40*a*. Namely, each load retaining member 60 functions as a stopper for the associated connecting link 40, and thus the link mechanism is not activated.

In this way, it is possible to prevent the headrest 3 from forwardly moving even upon generation of a rearward load at a certain level due to rapid acceleration of the vehicle or the like, by providing the load retaining members 60 between the lower links 45 and connecting links 40, respectively, so as to increase the motion commencement load for the link mechanisms, thereby preventing activation of the link mechanisms. This spring force P is, by way of example, set so that the motion commencement load for the link mechanisms is 500N in case of the load retaining members 60 of this embodiment where the tilt angle α of each first tilt surface 62*a* is set at 45 degrees, thereby enabling prevention of activation of the link mechanisms in an ordinary seating state, without affecting the activation of the link mechanisms upon rear-end collision.

Upon application of a larger load due to rear-end collision of the vehicle, the connecting links 40 are rearwardly moved in a manner to get over the boundary portions 62c between the first tilt surfaces 62a and second tilt surfaces 62b of the load retaining members 60 as shown in FIG. 4B and FIG. 5B, thereby activating the link mechanisms, respectively, to move the headrest 3 forward. At this time, the connecting links 40 are moved rearward (right in FIG. 5B) of the first tilt surfaces 62a of the blocking portions 62 of the load retaining members 60, respectively. When the load pushing the plate-like support body 50 is released from this state, the connecting links 40 are pulled in an upward direction, i.e., in a direction of arrow U in FIG. 4B by the return springs 57 disposed above the plate-like support body 50, so that the shafts 43 connecting the connecting links 40 to the lower links 45 are moved in a front upper direction, to rotate the lower links 45 in a direction of arrow E in FIG. 4B around the shafts 47, respectively.

At this time, as shown in FIG. 5B, the connecting links 40 are moved in a direction of arrow F in FIG. 5B, i.e., in a forward direction, while pushing the boundary portions 62c between the first tilt surfaces 62a and second tilt surfaces 62b of the load retaining members 60 against the spring forces P of the load retaining members 60, respectively. The spring forces P are set at such levels that the link mechanisms are allowed to be returned into ordinary states by urging forces of the return springs 57 against frictional forces between the load retaining members 60 and connecting links 40, respectively, so that the returning operations of the link mechanisms are not disturbed.

Further, the tilt angles β of the second tilt surfaces 62b relative to the rearward movement direction (direction of arrow B in FIG. 5A) of the associated connecting links 40 are set to be smaller than the tilt angles α of the first tilt surfaces 62a, respectively. Thus, the connecting links 40 are allowed to continue the rearward movements by lower loads once a load exceeding the motion commencement load for the link mechanisms are applied and thus the connecting links 40 have commenced rearward movement, while the forward movements of the connecting links 40 are not obstructed by the load retaining members 60 when the connecting links 40 are returned by the forward movements. Namely, operating functions of the link mechanisms are not affected by the load retaining members 60.

Further, the arrangement positions of the load retaining members 60 are appropriately settled so that the front ends 40b of the connecting links 40 are moved within such ranges that the front ends 40b are not positioned rearward of the boundary portions 62c between the first tilt surfaces 62a and second tilt surfaces 62b of the blocking portions 62 (i.e., ranges up to the positions of the connecting links 40 shown in FIG. 5B), respectively. Limiting the moving ranges of the connecting links 40 in this way, allows the connecting links 40 to operate without obstruction against the movements thereof by the blocking portions 62 of the load retaining members 60, respectively, when the connecting links 40 return into ordinary states, respectively.

Although the load retaining members 60 of this embodiment are disposed to fix the locking portions 61 to the lower links 45 and the blocking portions 62 are directed toward the connecting links 40 sides to thereby block the movements of the connecting links 40, respectively, the load retaining members may be disposed in opposite orientations, respectively. Namely, it is also possible to obtain the same effect, by clamping and fixing the connecting links 40 by the locking portions 61, and disposing the blocking portions 62 by directing them toward the lower links 45 sides, respectively.

Further, although the upper links 35 for causing the headrest mounting rod 30 to be rotatable comprise the link brackets 36 and rotate supporting members 39 in this embodiment, respectively, the upper links are not limited thereto and it is enough for them to have configurations for transmitting rotatable forces from the lower links 45 to the headrest 3 to thereby forwardly move it, such as a configuration disclosed in the '094 Publication, where multiple link rods are used to make a headrest rotatable.

Although in the load retaining members 60 of the above embodiment, the tilt angles α of the first tilt surfaces 62a relative to the rearward movement direction of the connecting links 40 are each set at 45 degrees, the tilt angles α can be set at arbitrary values without limit thereto. In case of load retaining members 60 where tilt angles α of first tilt surfaces 62a have larger values, i.e., where the first tilt surfaces are formed to have larger tilts, it becomes possible to increase the motion commencement load for the connecting links 40, thereby enabling enhancement of a capability of preventing activation of the link mechanisms in a situation other than rear-end collision, and a capability of preventing a backlash in an ordinary seating state. In turn, in case of load retaining members 60 where tilt angles α of first tilt surfaces 62a have smaller values, i.e., where the first tilt surfaces are formed to have gentle tilts, it becomes possible to ensure activation of the link mechanisms upon occurrence of rear-end collision and to facilitate and ensure the return of the link mechanisms after activation, thereby improving the capabilities of the link mechanisms.

Figure 7A:
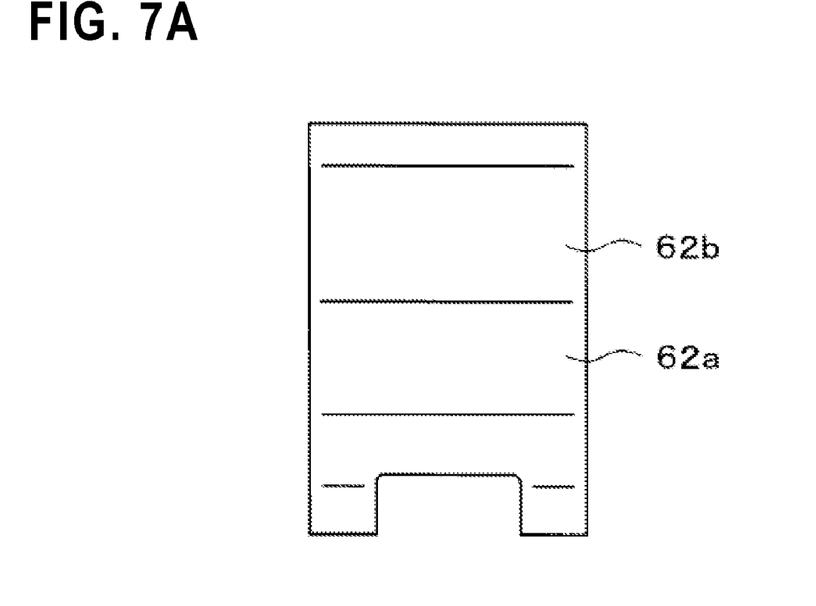
FIGS. 7A, B are front and side views of a load retaining member according to another embodiment.
Figure 7B:
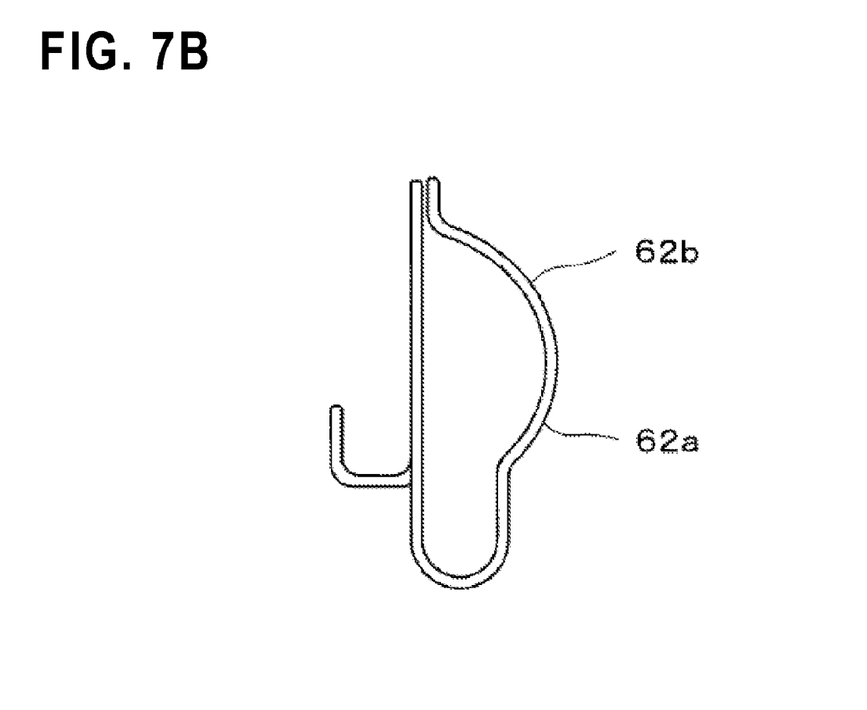

Further, it is also possible to form a load retaining member 60 into a shape shown in FIGS. 7A, B. FIGS. 7A, B show another embodiment of the load retaining member 60, in which FIG. 7A is a side view of the load retaining member 60 of the embodiment, and FIG. 7B is a front view thereof. The load retaining member 60 of this embodiment includes a blocking portion 62 having a first tilt surface 62a and a second tilt surface 62b, which are formed of a continuously curved surface (rounded surface). Compared with the case that the first tilt surface 62a and the second tilt surface 62b are formed of a flat surface, forming the blocking portion 62 into the rounded shape in this way further smoothens activation of link mechanisms upon occurrence of rear-end collision and return of the link mechanisms after the activation thereof, thereby enabling to ensure the operation of the link mechanisms. Further, since the link mechanisms can be modified in a motion commencement load therefor by modifying a curvature of the roundness of the blocking portion 62, it is enough to appropriately determine the curvature in a manner to obtain a desired motion commencement load.

In addition to the fact that the load retaining member 60 can be modified in angle, curvature, and the like of the blocking portion 62 as described above, it is possible to modify the shape of the load retaining member 60 to modify the spring force (elasticity) thereof. It is also possible to set a spring constant of the load retaining member 60 at an appropriate value by modifying a plate thickness, plate width, material (hardness) or the like of a plate spring constituting the load retaining member 60, to adjust a spring force (elasticity) thereof commensurately with a motion commencement load for link mechanisms. These factors can be adopted by appropriately determining them, so as to obtain a desired capability in conformity to a threshold value of the motion commencement load for the link mechanisms.

Forming the load retaining member 60 by adjusting the spring force, shape, and the like thereof in this way, enables adjusting the motion commencement load correspondingly to a type of a vehicle seat.

According to the vehicle seat as explained above, the load retaining members 60 are provided to increase the motion commencement load for the link mechanisms, so that a forward movement of the headrest 3 by activation of the link mechanisms can be prevented even when a load such as is caused by rapid acceleration of a vehicle, which load is smaller than that upon rear-end collision and which load has a certain level, is applied to the seat-back 2, without affecting the activating functions of the link mechanisms upon rear-end collision.

Further, the load from the plate-like support body 50 can be mitigated by the load retaining members 60 to thereby restrict backlash of the plate-like support body 50 even in case of rapid acceleration, sudden stop, and the like, thereby enabling an excellent lumbar supporting capability, so that a function to protect a head portion of occupant upon rear-end collision can be established simultaneously with a seating function.

TABLE OF REFERENCE CHARACTERS

S vehicle seat
1 seating portion
2 seat-back
3 headrest
4 cushion material
5 outer cover material
7 head-portion supporting part
8 pillar
10 seating frame
11 base frame
20 seat-back frame
21 side frame
22 upper frame
23 lower frame
30 headrest mounting rod
31 pillar supporting member
35 upper link
36 link bracket
37, 38 shaft
39 rotate supporting member
40 connecting link
   40a rear end
   40b front end
43 shaft
45 lower link
   45a engaging convex portion
   45b engaging concave portion
47 shaft
48 wire locking hole
50 plate-like support body (pressure receiving part)
51, 52 wire spring
57 return spring
58 spring supporting wire
60 load retaining member (blocking means/element(s))
   60a, 60b, segment
   60c, 60d,
   60e, 60f,
   60g, 60h
61 locking portion
   61a engaging groove
   61b pressure engaging portion
62 blocking portion
   62a first tilt surface
   62b second tilt surface
   62c boundary portion
63 connecting portion
64 flexure allowing portion
   64a groove
   64b guiding portion

The invention claimed is:

1. A vehicle seat having a mechanism for moving a headrest upon rear-end collision, comprising:
a pressure receiving part for receiving a load of a rearward movement of an occupant;
a transmitting element for transmitting the load received by the pressure receiving part to a headrest side; and
a blocking element for blocking the load received by the pressure receiving part from being transmitted to the transmitting element, until the load reaches a predetermined level;
wherein:
the transmitting element comprises:
a lower link rotatable mounted to a lower portion of a seat-back frame of the vehicle seat and connected to the pressure receiving part;
an upper link connected to the headrest to allow for a rotation thereof; and
a connecting link for connecting the lower link and the upper link to each other, and configured to operate in an interlocking manner with a rotation of the lower link; and
the blocking element is held by one of the lower link and the connecting link, and is configured to urge the lower link and the connecting link in a separating direction.

2. The vehicle seat of claim 1, wherein the blocking element is formed from a plate spring.

3. The vehicle seat of claim 1, wherein at least a part of the blocking element is disposed between the lower link and the connecting link.

4. The vehicle seat of claim 3, wherein the blocking element formed from a plate spring.

5. The vehicle seat of claim 3, wherein the blocking element includes a locking portion configured to be held by one of the lower link and the connecting link, and a blocking portion configured to block a movement of the other of the lower link and the connecting link.

6. The vehicle seat of claim 5, wherein the blocking element is formed from a plate spring.

7. The vehicle seat of claim 5, wherein the blocking portion comprises:
a first tilt surface having a certain angle relative to a moving direction in which the lower link or the connecting link moves based on the load received by the pressure receiving part, and
a second tilt surface continued from the first tilt surface and tilted relative to the moving direction and in a direction opposite to the first tilt surface, to thereby block the movement of the lower link or the connecting link by the first tilt surface.

8. The vehicle seat of claim 7, wherein the blocking element is formed from a plate spring.

9. The vehicle seat of claim 7, wherein the second tilt surface defines an angle relative to the moving direction in which the lower link or the connecting link moves, which angle is smaller than the angle of the first tilt surface.

10. The vehicle seat of claim 9, wherein the blocking element is formed from a plate spring.

11. The vehicle seat of claim 7, wherein the first tilt surface and the second tilt surface of the blocking portion are formed of a curved surface.

12. The vehicle seat of claim 11, wherein the blocking element is formed from a plate spring.

* * * * *